(12) United States Patent
Dietrich et al.

(10) Patent No.: US 10,094,738 B2
(45) Date of Patent: Oct. 9, 2018

(54) METHOD FOR DETERMINING ANGLE ERRORS AND LIGHT-EMITTING DEVICE

(71) Applicant: Robert Bosch GmbH, Stuttgart (DE)

(72) Inventors: Manuel Dietrich, Reutlingen (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 18 days.

(21) Appl. No.: 15/455,990

(22) Filed: Mar. 10, 2017

(65) Prior Publication Data

US 2017/0261400 A1   Sep. 14, 2017

(30) Foreign Application Priority Data

Mar. 11, 2016   (DE) .................. 10 2016 203 996

(51) Int. Cl.
| | |
|---|---|
| *G01C 1/00* | (2006.01) |
| *G01M 11/00* | (2006.01) |
| *G01B 11/27* | (2006.01) |
| *G01C 15/00* | (2006.01) |
| *G01M 11/06* | (2006.01) |

(52) U.S. Cl.
CPC ......... *G01M 11/005* (2013.01); *G01B 11/272* (2013.01); *G01C 15/002* (2013.01); *G01M 11/061* (2013.01)

(58) Field of Classification Search
CPC ....... G01S 17/74; G01B 11/26; G01B 11/272; G01C 15/002; F41G 3/326
USPC ...................................................... 356/152.3
See application file for complete search history.

(56) References Cited

U.S. PATENT DOCUMENTS

| | | | | |
|---|---|---|---|---|
| 6,563,593 | B2 * | 5/2003 | Hill ....................... | G01B 11/26 356/491 |
| 8,842,291 | B2 * | 9/2014 | Turner ................... | G02B 27/62 356/510 |
| 2005/0166118 | A1 * | 7/2005 | Demarest ............ | G03F 7/70775 714/746 |

FOREIGN PATENT DOCUMENTS

DE   19907943 A1   9/2000

* cited by examiner

*Primary Examiner* — Md M Rahman
(74) *Attorney, Agent, or Firm* — Norton Rose Fulbright US LLP; Gerard Messina

(57) ABSTRACT

A method is described for determining angle errors when measuring slewing angles of a pivoted light-deflecting device, including the following steps: emitting a first light beam and a second light beam, which enclose a light beam angle, onto the light-deflecting device; receiving the first light beam and second light beam deflected by the light-deflecting device and reflected by an object; calculating a first propagation path of the first light beam and a second propagation path of the second light beam; pivoting the light-deflecting device from an initial position to a final position, respective slewing angles of the light-deflecting device being measured in the process and a dependency of the first propagation path on the measured slewing angles being determined; and calculating an angle error for a measured slewing angle to be corrected from the set of measured slewing angles by using the light beam angle, the second propagation path and the dependency of the first propagation path on the measured slewing angle.

10 Claims, 7 Drawing Sheets

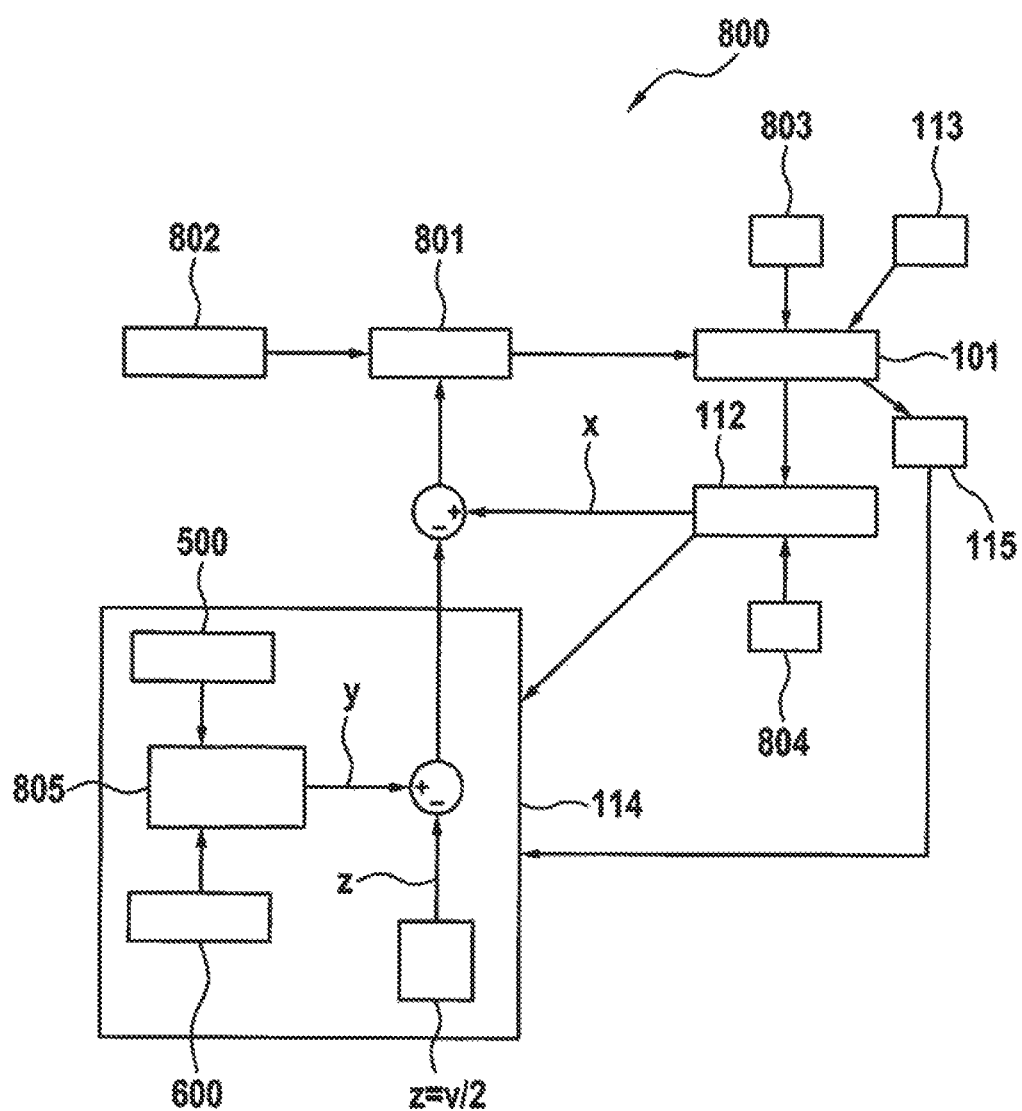

US 10,094,738 B2

METHOD FOR DETERMINING ANGLE ERRORS AND LIGHT-EMITTING DEVICE

FIELD OF THE INVENTION

The present invention relates to a method for determining angle errors when measuring slewing angles of a pivoted light-deflecting device and a light-emitting device.

BACKGROUND INFORMATION

Scanning micromirror systems have been used for some time in a multitude of applications. In motor vehicles, for example, micromirrors are used both as headlights as well as for distance-measuring systems. German Published Patent Application No. 199 07 943 A1 describes a headlight system for vehicles, which has a light source, a reflector and a deflecting device. Frequently, the light beams deflected by the micromirror are received, following the reflection on an object, by a receiver and a distance of the reflecting object is calculated on the basis of a light-propagation time of the emitted light beam. Furthermore, it is possible to determine the distance between two objects via the law of cosines. Both for precise distance determination as well as for precise illumination by light beams, it is necessary to deflect the micromirror with great precision. For this purpose, the slewing angle of the micromirror must be known precisely.

SUMMARY

The present invention creates a method for determining angle errors when measuring slewing angles of a pivoted light-deflecting device and a light-emitting device.

Accordingly, the present invention creates a method for determining angle errors when measuring slewing angles of a pivoted light-deflecting device. In a first method step, a first light beam and a second light beam, which enclose a light beam angle, are emitted onto the light-deflecting device. Furthermore, the first light beam deflected by the light-deflecting device and reflected by an object and the second light beam deflected by the light-deflecting device and reflected by the object are received. A first propagation path of the first light beam and a second propagation path of the second light beam are calculated. The light-deflecting device is pivoted from an initial position to a final position, respective slewing angles of the light-deflecting device being measured and a dependency of the first propagation path on the measured slewing angles being determined. An angle error for a slewing angle to be corrected is calculated from the set of the measured slewing angles, the light beam angle, the second propagation path and the dependency of the first propagation path on the measured slewing angle being used for this purpose. The light beam angle is preferably known in this instance, for example by previous measurement.

The present invention furthermore creates a light-emitting device having a pivoted light-deflecting device, which is designed to deflect light beams. The light-emitting device furthermore includes a transmitting device, which is designed to transmit a first light beam and a second light beam, which enclose a light beam angle, to the light-deflecting device, as well as a receiving device, which is designed to receive the first light beam and the second light beam deflected by the light-deflecting device and reflected by an object. The light-emitting device furthermore includes a calculating device, which is designed to calculate a first propagation path of the first light beam and a second propagation path of the second light beam. Finally, the light-emitting device includes an angular position measuring device, which is designed to measure respective slewing angles of the light-deflecting device when the light-deflecting device is pivoted from an initial position to a final position. The calculating device is designed to determine a dependency of the first propagation path on the measured slewing angles and to calculate an angle error for a slewing angle to be corrected from the set of the measured slewing angles by using the light beam angle, the second propagation path and the dependency of the first propagation path on the measured slewing angle.

Preferred developments are the subject matter of the respective dependent claims.

It is possible to determine the light beam angle that is formed between the first light beam and the second light beam with great precision. It is possible to determine the angle error with comparable precision on the basis of geometrical considerations by comparison of the first and second propagation paths. This makes it possible to correct the potentially erroneously measured slewing angle and thereby to ascertain the actual slewing angle. Thus it is possible to improve the precision of the light-emitting device according to the present invention substantially.

According to a preferred development of the method of the present invention, an actual slewing angle is calculated on the basis of the light beam angle and the calculation of the angle error occurs by comparing the slewing angle to be corrected to the actual slewing angle.

According to a preferred development of the method of the present invention, the slewing angle to be corrected is determined as that measured slewing angle at which the first propagation path is of the same magnitude as the second propagation path in the initial position. For this case, it is easy to ascertain the geometrical relationship between the light beam angle and the actual slewing angle, and thus it is possible to calculate the angle error precisely.

According to a preferred development of the method of the present invention, a dependency of the second propagation path on the measured slewing angles is furthermore determined during the pivoting process. The angle error is calculated by using the dependency of the second propagation path on the measured slewing angle. Thus, a complete course of the first propagation path is known as a function of the measured slewing angle and a complete course of the second propagation path is known as a function of the measured slewing angle.

According to a preferred development of the method of the present invention, the slewing angle to be corrected is determined as that measured slewing angle, by which the first propagation path as a function of the measured slewing angle must be shifted along the abscissa in order to coincide with the second propagation path as a function of the measured slewing angle at least in a slewing range about the initial position. If one plots the first propagation path as a function of the measured slewing angle, then this is shifted with respect to the course of the second propagation path as a function of the measured slewing angle only along the abscissa. The shift here corresponds to the sum of the actual slewing angle and the angle error. It is possible to calculate the actual slewing angle, however, on the basis of the light beam angle. It is thus possible to ascertain the angle error by subtraction. It is thus possible to correct the measured slewing angle accordingly.

According to a preferred development of the light-emitting device, the transmitting device includes a light source for emitting a light beam and a beam splitter. The beam splitter is developed in such a way that it splits the emitted light beam into the first light beam and the second light beam. As a result, only one laser is required, which makes it possible to reduce the manufacturing costs. Furthermore, the transmitting device may be constructed in such a way that the light beam angle enclosed between the first light beam and the second light beam is exactly known.

According to a preferred development, the light-emitting device furthermore includes a control unit that is designed to use the measured slewing angle and the calculated angle error to control the light-deflecting device in such a way that the light-deflecting device is pivoted by a specified actual slewing angle. The control unit for this purpose preferably corrects the measured slewing angle by the calculated angle error and is thus able to ascertain the actual slewing angle and pivots the light-deflecting device in such a way that the controlled actual slewing angle matches the specified actual slewing angle.

According to a preferred development of the light-emitting device, the calculating device is designed to calculate the actual slewing angle on the basis of the light beam angle and to calculate the angle error by comparing the slewing angle to be corrected to the actual slewing angle.

According to a preferred development of the light-emitting device, the calculating device is furthermore designed to determine the slewing angle to be corrected as that measured slewing angle for which the first propagation path has the same magnitude as the second propagation path in the initial position.

BRIEF DESCRIPTION OF THE DRAWINGS

FIG. 9 shows a block diagram of a light-emitting device according to a specific embodiment of the invention.

DETAILED DESCRIPTION

Unless indicated otherwise, identical or functionally equivalent elements and devices have been provided with the same reference symbols. The numbering of the method steps is provided for reasons of clarity and in particular is not meant to imply a specific time sequence, unless indicated otherwise. In particular, it is also possible to carry out multiple method steps at the same time. Furthermore, unless indicated otherwise, it is possible to combine different specific embodiments with one another arbitrarily.

Figure 1:
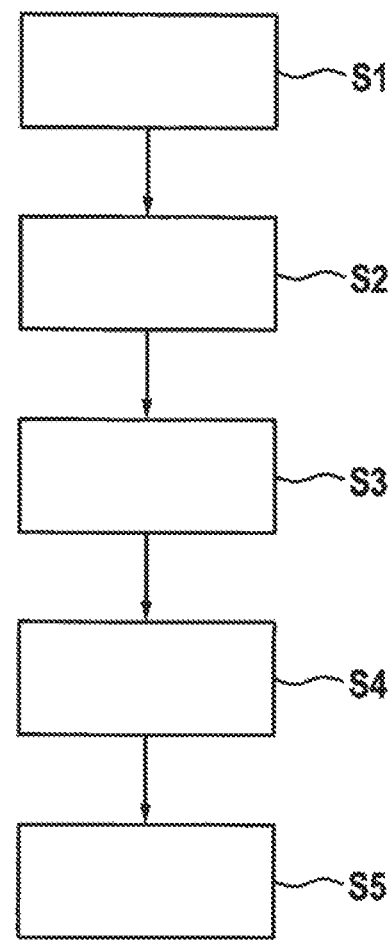
FIG. 1 shows a flow chart of a method for determining angle errors according to a specific embodiment of the invention.
Figure 2:
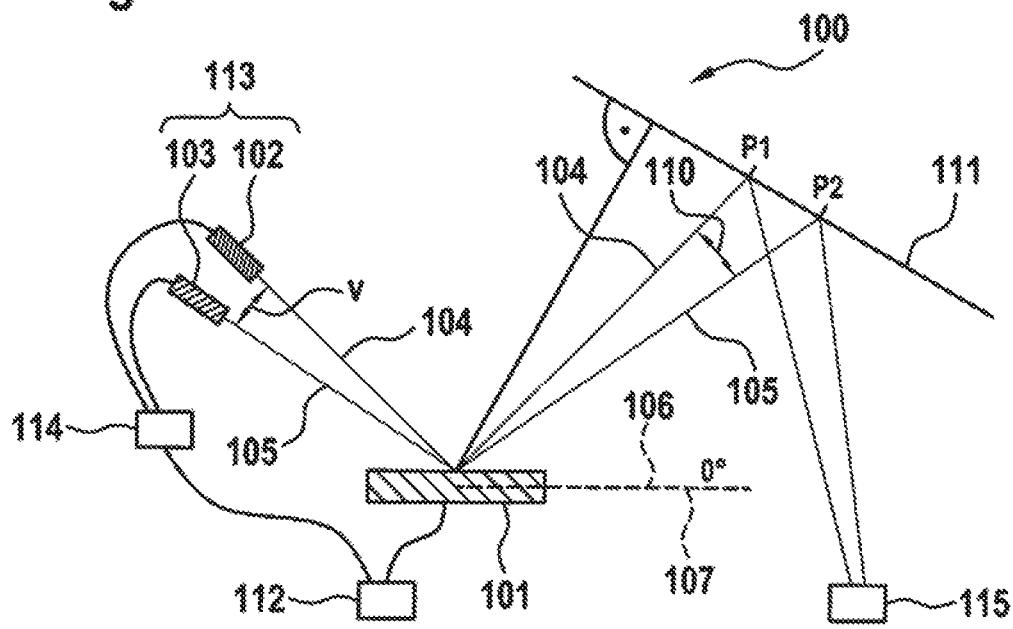
FIGS. 2, 3 show sectional views of a light-emitting device according a specific embodiment of the invention.

FIG. 1 shows a flow chart for explaining a method for determining angle errors when measuring slewing angles of a pivoting light-deflecting device 101. The method is illustrated in more detail below with reference to a light-emitting device 100 shown in FIG. 2, which is provided for carrying out the method of the present invention.

Light-emitting device 100 includes a pivoted light-deflecting device 101, which is developed to deflect light beams. Light-deflecting device 101 preferably includes a mirror, in particular a microelectromechanical micromirror (MEMS micromirror). Light-deflecting device 101 may be disposed on a substrate via spring elements for example and may be pivoted out of its position of rest about one or multiple axes by the application of an electrical voltage.

Furthermore, light-emitting device 100 includes a transmitting device 113. Transmitting device 113 includes a first light source 102 and a second light source 103, which are designed for emitting laser light. First light source 102 is designed for emitting a first light beam 104 and second light source 103 is designed for emitting a second light beam 105. First light beam 104 and second light beam 105 are directed onto light-deflecting device 101. First light beam 104 and second light beam 105 intersect at a point on light-deflecting device 101, first light beam 104 and second light beam 105 enclosing a light beam angle v. Light beam angle v may be between 5 and 50° for example. Light beam angle v may be 10° for example.

According to additional specific embodiments, a real or virtual intersection of first light beam 104 and second light beam 105 may be in front of or behind light-deflecting device 101.

First light beam 104 is deflected by light-deflecting device 101 and is reflected by an object 111, for example a wall. First light beam 104 in the process strikes a first point P1 of object 111.

Analogously, second light beam 105 is deflected by light-deflecting device 101 and is reflected by object 111, second light beam 105 striking a second point P2 of object 111. The reflected first light beam 104 and reflected second light beam 105 are subsequently received by a receiving device 115. Light-emitting device 100 furthermore includes a calculating device 114 that is designed to calculate a first propagation path d1 of the first light beam 104 and a second propagation path d2 of the second light beam 105 on the basis of the propagation time of the first light beam 104 and, respectively, second light beam 105, that is, the time difference between the emission and the reception of the first and, respectively, second light beam 104, 105.

According to a specific embodiment, receiving device 115 is situated on the first light source 102 and, respectively, second light source 103. The reflected first light beam 104 and the reflected second light beam 105 are in turn deflected by light-deflecting device 101 and are received by receiving device 115. The propagation path d1 of first light beam 104 and the propagation path d2 of second light beam 105 are twice the sum of the distance from first light source 102 and, respectively, second light source 103 to light-deflecting device 101 and the distance of the first point P1 and, respectively, second point P2 of object 111 to light-deflecting device 101.

According to another specific embodiment, receiving device 115 is integrated into light-deflecting device 101.

According to another specific embodiment, receiving device 115 is separated from transmitting device 113.

Light-emitting device 100 furthermore comprises an angular position measuring device 112, which is designed to measure respective slewing angles x of light-deflecting device 101 when light-deflecting device 101 is pivoted from an initial position to a final position.

Calculating device 114 is designed to determine a dependency of first propagation path d1 on measured slewing angle x and to calculate an angle error for a slewing angle y to be corrected from the set of measured slewing angles x by using light beam angle v, second propagation path d2 and the dependency of the first propagation path d1 on the measured slewing angle.

The method for determining angle errors when measuring slewing angles x of pivoting light-deflecting device 101 will be illustrated more precisely in the following.

In a first method step S1, first light beam 104 and second light beam 105 are emitted by first light source 102 and second light source 103, respectively, and enclose light beam angle v. First light beam 104 and the second light beam may be emitted simultaneously, but they may also be emitted in a multiplex process, in particular in a time-division multiplex process.

First light beam 104 and second light beam 105 are respectively deflected by light-deflecting device 101 and are reflected by object 111. In a second step S2, receiving device 115 receives reflected first light beam 104 and reflected second light beam 105.

Furthermore, in a method step S3, a first propagation path d1 of first light beam 104 and a second propagation path d2 of second light beam 105 are measured by calculating device 114. Light-deflecting device 101 is in this instance in an initial position illustrated in FIG. 2.

In a further method step S4, light-deflecting device 101 is pivoted out of the initial position into a final position.

According to one specific embodiment, second light source 103 is switched off during the process of pivoting. According to another specific embodiment, the second light source 103 may continue to be activated, receiving device 115 being oriented in such a way that it is able to identify whether a received light beam was emitted by first light source 102 or by second light source 103. This may be ensured in particular by a time-division multiplex process.

Figure 3:
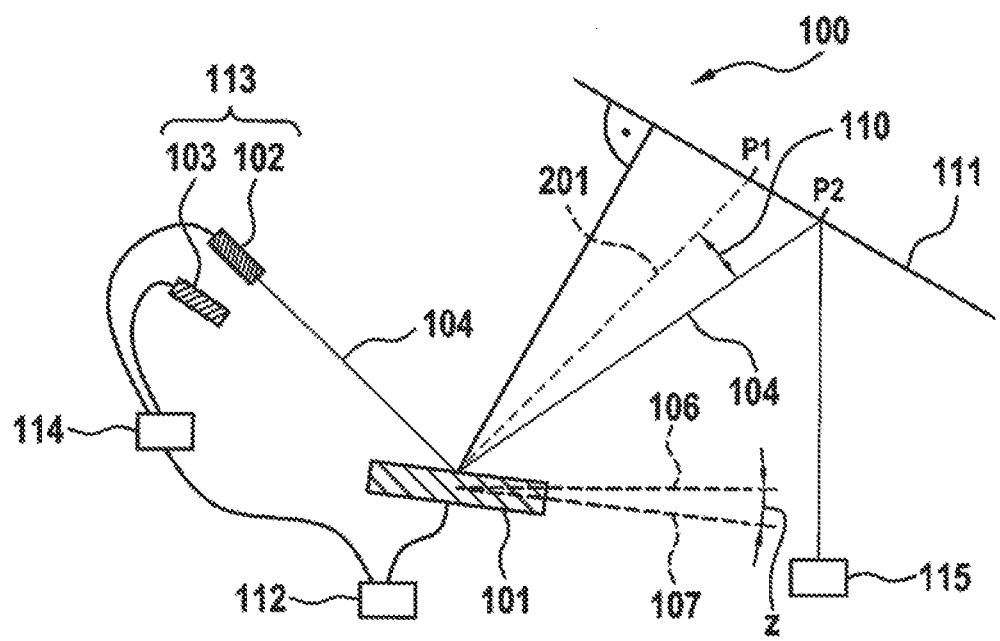

FIG. 3 illustrates light-deflecting device 101 in a pivoted position, an actual slewing angle z being formed between a plane 106 of light-deflecting device 101 in the initial position and a plane 107 of light-deflecting device 101 in the pivoted position. When pivoting light-deflecting device 101, a respective measured slewing angle x of light-deflecting device 101 is measured by angular position measuring device 112. Due to angle errors, it is possible for measured slewing angle x to differ from actual slewing angle z. Thus, the measured slewing angle x corresponds to the sum of the actual slewing angle z and the angle error.

During the pivoting of light-deflecting device 101, first light source 102 continues to emit a first light beam 104, which is deflected by light-deflecting device 101, is reflected by object 111 and is received by receiving device 115. Calculating device 114 measures path d1 of first light beam 104 during the pivoting process. Calculating device 114 is designed to determine a dependency of first propagation path d1 on the measured slewing angles x.

Figure 4:
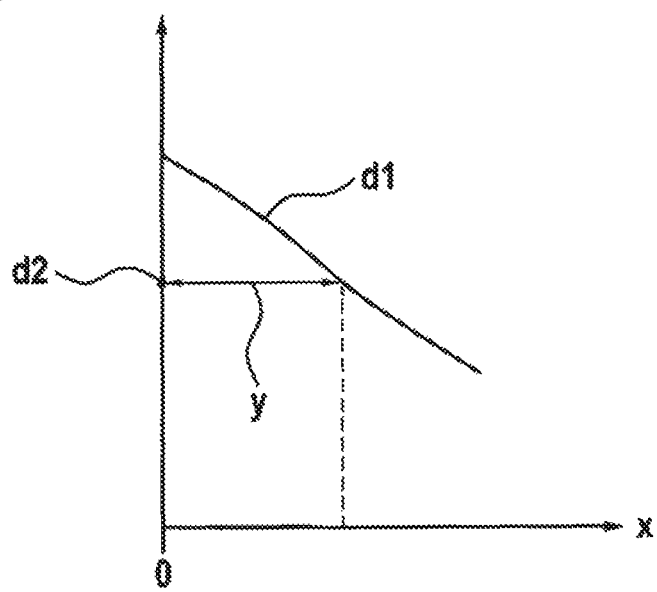
FIG. 4 shows an illustration of a dependency of a first and, respectively, second propagation path on a measured slewing angle according to a specific embodiment of the invention.

FIG. 4 illustrates the second propagation path d2 for the initial position, that is, for x=0, as well as the first propagation path d1 as a function of the measured slewing angle x.

In a fifth step S5, an angle error is calculated for a slewing angle y to be corrected from the set of measured slewing angles x. Light beam angle v, second propagation path d2 and the dependency of first propagation path d1 on the measured slewing angle x are used for this purpose.

The slewing angle y to be corrected is determined as that measured slewing angle x for which first propagation path d1 is of the same magnitude as second propagation path d2 in the initial position, as illustrated in FIG. 4. FIG. 3 illustrates the situation in which light-deflecting device 101 is pivoted about an actual slewing angle z, which corresponds to the slewing angle y that is to be corrected. In this case, light-deflecting device 101 is pivoted in such a way that the first light beam 104 emitted by first light source 102 is deflected by light-deflecting device 101 in such a way that it strikes the second point P2 of object 111 and is reflected there. First light beam 104 is thus deflected in the pivoted position of light-deflecting device 101 to precisely that second point P2 onto which second light beam 105 was deflected in the initial position. FIG. 3 additionally shows a beam trajectory 201 that corresponds to the beam trajectory of deflected first light beam 104 in the initial position. A beam trajectory angle 110 is enclosed between this beam trajectory 201 and the deflected first light beam 104, which is of the same magnitude as light beam angle v. In other words, the deflected first light beam 104 is slewed from the first initial position by light beam angle v. This the case precisely when the actual slewing angle z is equal to half the light beam angle v.

It is possible to measure light beam angle v precisely, for example, by fixating first light source 102 and second light source 103 firmly with respect to each other. The angle error is now calculated by subtraction by comparing the measured slewing angle y to be corrected with the actual angle z calculated on the basis of light beam angle v.

For example, if light beam angle v equals 10°, then the actual slewing angle z=10°/2=5°. If now a measured slewing angle y of 6° is measured, then the angle error of the slewing angle y measured by measuring device 112 is calculated as y−z=6°−5°=1°.

According to another specific embodiment, the method is carried out iteratively, angle errors being calculated for actual slewing angles z equal to an integer multiple of half of light beam angle v.

According to another specific embodiment, second light source 103 is not switched off during the process of pivoting. While light-deflecting device 101 is pivoted, second light source 103 continues to emit a second light beam 105, which is deflected by light-deflecting device 101 and is reflected by object 111 and is received by receiving device 115. As described above, second propagation path d2 of second light beam 105 is measured. Preferably, thus both the first propagation path d1 of first light beam 104 as well as the second propagation path d2 of second light beam 105 are measured continuously while light-deflecting device 101 is pivoted. During the pivoting process, a dependency of second propagation path d2 on measured slewing angles x is determined, the angle error being calculated by additionally using the dependency of the second propagation path d2 on the measured slewing angle x.

Figure 5:
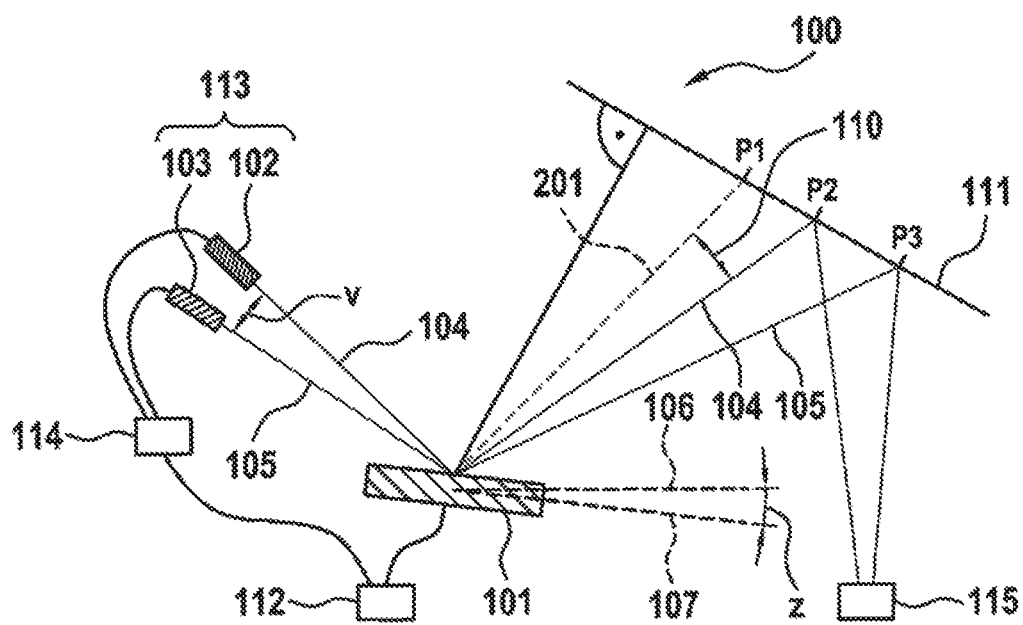
FIG. 5 shows a sectional view of a light-emitting device according to a specific embodiment of the invention.
Figure 6:
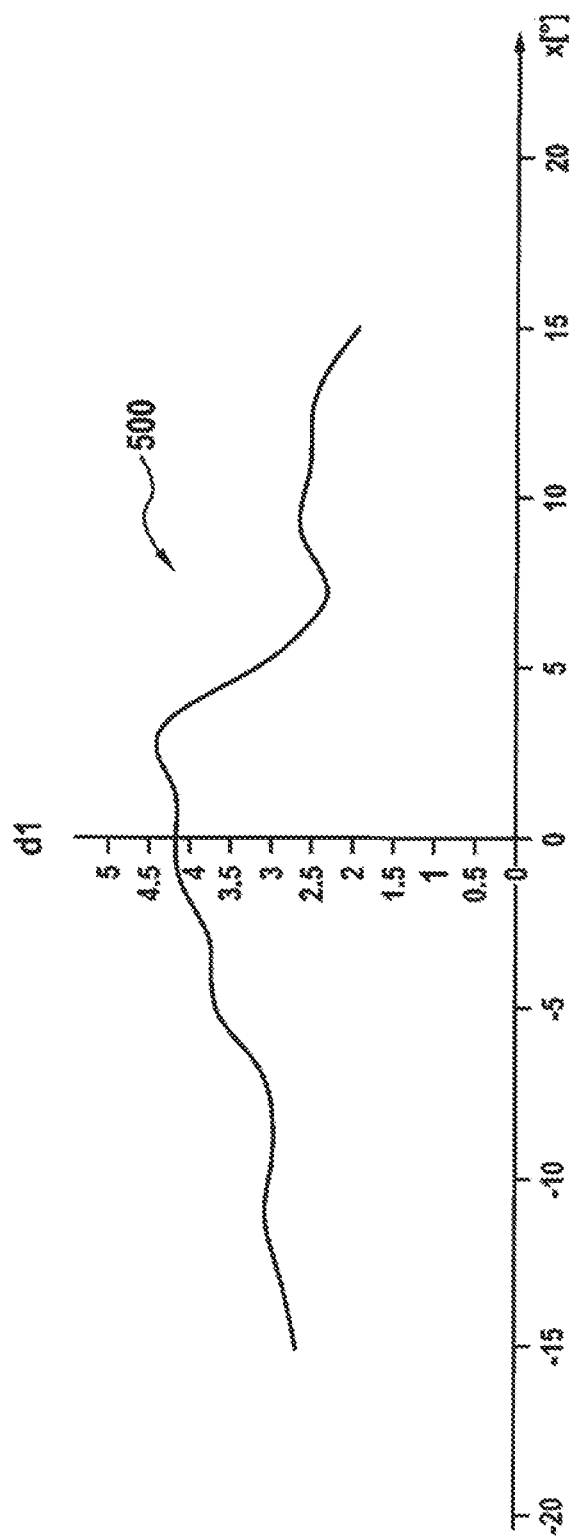
FIGS. 6, 7, 8 show illustrations of a dependency of a first and, respectively, second propagation path on a measured slewing angle according to a specific embodiment of the invention.
Figure 7:
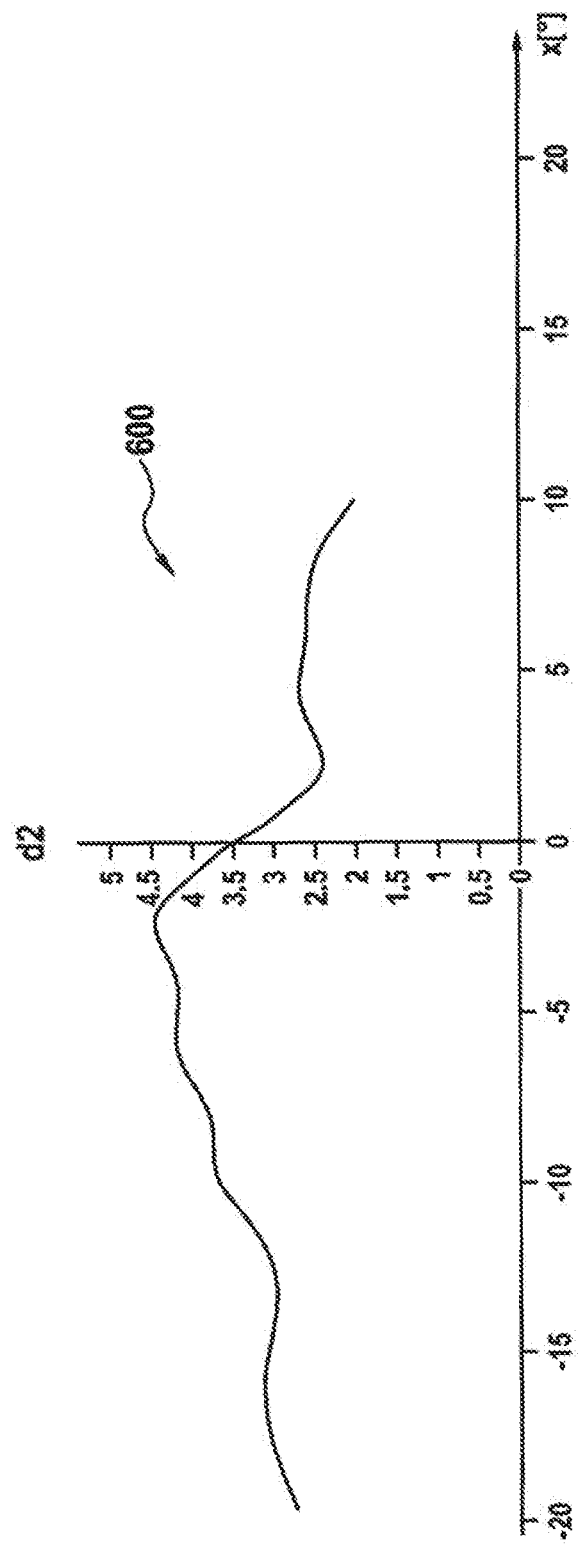
Figure 8:
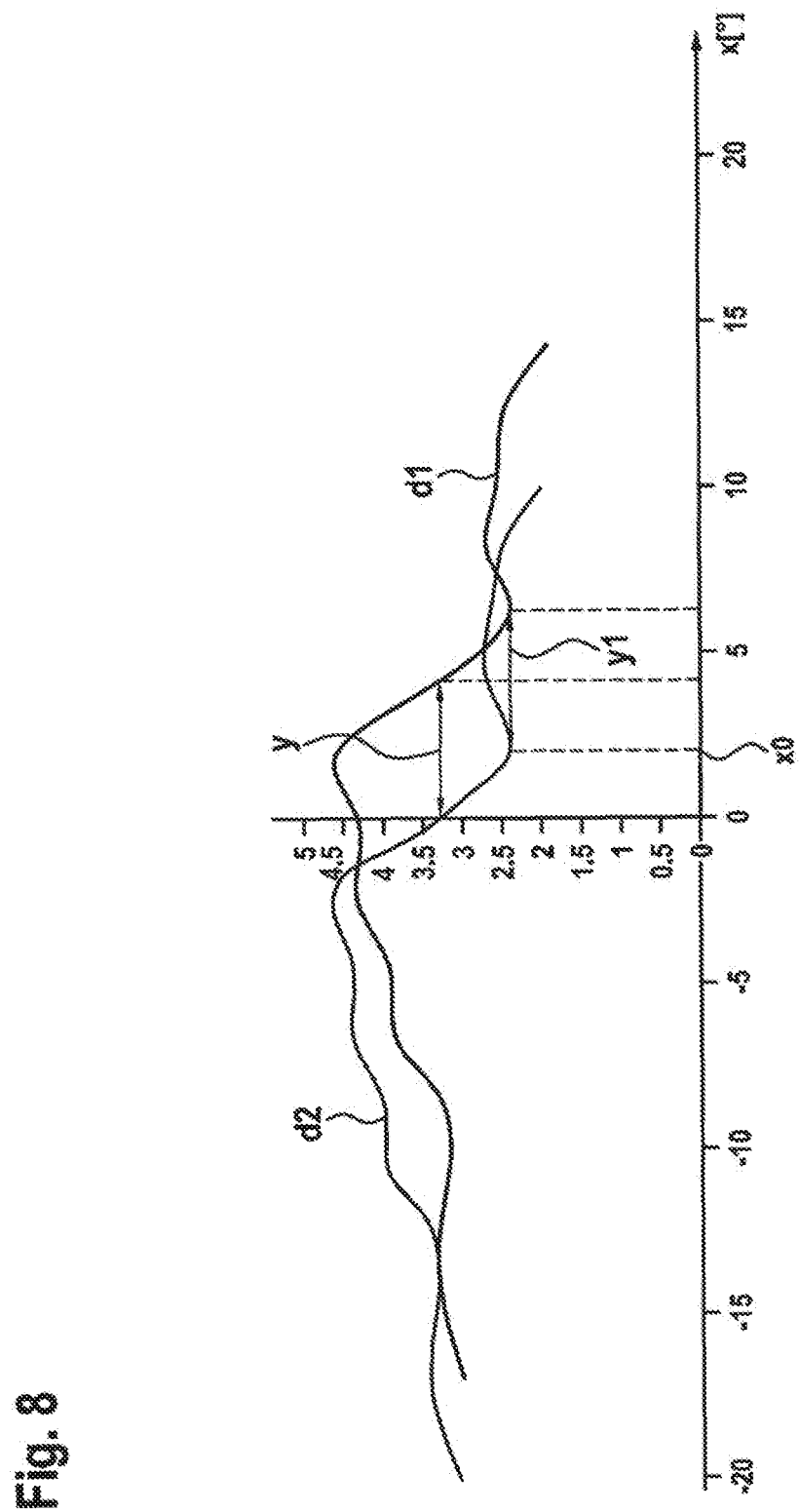

A pivoted position is illustrated in FIG. 5. FIG. 6 illustrates a dependency 500 of first propagation path d1 of first light beam 104 on measured slewing angle x, and FIG. 7 illustrates a dependency 600 of second propagation path d2 on measured slewing angle x. FIG. 8 shows both the first propagation path d1 as well as the second propagation path d2 as a function of measured slewing angle x. In analogy to the specific embodiment described above, it is again possible to determine a slewing angle y that is to be to be corrected as a function of that measured slewing angle, for which first propagation path d1 is of equal magnitude as second propagation path d2 in the initial position. The angle error is then calculated in analogy to the above-described specific embodiment.

According to another specific embodiment, an arbitrarily specified measured slewing angle x0 may be determined as the initial position, and a slewing angle y1 to be corrected may be determined from the set of measured slewing angles x. According to one specific embodiment, it is possible to determine the slewing angle y1 to be corrected as that slewing angle, for which the first propagation path d1 is of equal magnitude as the second propagation path d2 in the initial position.

In FIGS. 6 through 8, the course of first propagation path d1 and, respectively, second propagation path d2 as a function of measured slewing angle x is irregular since the reflecting object in this case has a greatly varying distance from light-deflecting device 101. According to another specific embodiment, the slewing angle y to be corrected is therefore determined as that measured slewing angle by which the first propagation path d1 as a function of the measured slewing angle x must be shifted in order to match the second propagation path d2 as a function of the measured slewing angle at least in one slewing angle range about the initial position, that is, about the specified measured slewing angle x0. As above, again an angle error of the slewing angle y1 to be corrected is determined.

According to one specific embodiment, light-deflecting device 101 is pivoted only until first propagation path d1 is of the same magnitude as second propagation path d2. The final position thus corresponds to that position in which the actual slewing angle z corresponds to half of the light beam angle v.

The method for determining angle errors may be implemented by triggering an control button or in fully automatic fashion, for example when the light-emitting device is started. The light-emitting device may thus be calibrated automatically.

According to other specific embodiments, an angle error for arbitrary measured slewing angles y to be corrected is calculated by interpolation from of the calculated angle errors for the measured slewing angle y to be corrected.

According to another specific embodiment, the angle error may be calculated for a plurality of interpolation points. The angle errors calculated for the interpolation points may be interpolated to arbitrary measured slewing angles y to be corrected by an interpolation method.

FIG. 9 illustrates a light-emitting device 800 according to another specific embodiment of the present invention. Light-emitting device 800 comprises a transmitting device 113, a receiving device 115 and a pivoting light-deflecting device 101, as described above, and an angular position measuring device 112, which is designed to measure a slewing angle of light-deflecting device 101.

The light-emitting device 800 furthermore comprises a calculating device 114, which has a comparator unit 805 that is designed to compare a dependency 500 of first propagation path d1 on measured slewing angle x with a dependency 600 of second propagation path d2 on measured slewing angle x and to output the measured slewing angle y to be corrected according to one of the methods described above. Calculating device 114 is designed to calculate the angle error by subtracting the actual slewing angle z, that is, half of light beam angle v, from the output measured slewing angle y to be corrected.

Light-emitting device 800 furthermore includes a control unit 801, which is designed, using slewing angle x measured by angular position measuring device 112 and the angle error calculated by calculating device 114, to control the light-deflecting device 101 in such a way that light-deflecting device 101 pivots by an actual slewing angle specified by a control unit 802. Control unit 801 for this purpose uses the actual slewing angle specified by control unit 802 as a setpoint value and the value obtained by subtraction of the calculated angle error from the measured slewing angle x as an actual value.

Light-emitting device 800 is thus designed, on the basis of the calculated angle error, to take into account and to correct both disturbance variables 803 relating to light-deflecting device 101, for example changes due to temperature or mechanical stress, as well as disturbance variables 804 relating to angular position measuring device 112, for example temperature or mechanical stress.

Control unit 802 comprises preferably a microcontroller and/or a field programmable gate array (FPGA) and/or a dedicated application-specific integrated circuit (ASIC). According to another specific embodiment, the angle error is transmitted directly to the control unit 802. Light-emitting device 800 may preferably be used to calculate distances from objects on the basis of the propagation paths of first light beam 104 and/or second light beam 105. Preferably, a calculated distance of an object may be corrected on the basis of an angle error stored in control unit 802.

According to another specific embodiment, both the first light source 101 as well as the second light source 102 are used to calculate distances. Preferably, an overlapping region, in which the angle errors may be calculated on the basis of the above-described methods, is as great as possible.

According to another specific embodiment, only one single light source is used, an emitted light beam being split by using an optical beam splitter, in particular a diffractive optical element, a prism or a partially transmitting mirror, into first light beam 104 and second light beam 105.

Preferably, transmitting device 113 may additionally have a mechanical and/or optoelectrical occlusion device in order to mask first light beam 104 and/or second light beam 105.

According to another specific embodiment, light-deflecting device 101 may be pivoted in more than one direction, corresponding angle errors being determined according to the above-described method. Preferably, the second light source 103 may be tilted for this purpose.

According to another specific embodiment, more than two light sources are used. This has the advantage of allowing coverage of a greater angle range of light-emitting device 100. On the one hand, the overlap between the angle ranges of respectively two light sources, which are illuminable by pivoting light-emitting device 101, may be set to be great enough to calculate the angle error with the aid of the method of the present invention. On the other hand, the use of multiple light sources allows for light to be emitted into a large angle range by deflection of the light-deflecting device.

According to another specific embodiment, the overlap between the angle ranges of respectively two light sources, which are illuminable by pivoting light-deflecting device 101, is set to be small so that it is possible to emit light into a large angle range by deflection of the light-deflecting device using few light sources.

According to other specific embodiments, it is possible for different light sources to emit light beams having different wavelength ranges and/or colors.

According to another specific embodiment, light-deflecting device 101 may be deflected along two axes simultaneously.

According to another specific embodiment, it is possible to arrange multiple light-deflecting devices 101, which are pivoted about different axes of rotation, in order to emit light into a large spatial angle range. It is thus possible to use the present invention also for arbitrary multidimensional applications. In particular, it is possible to arrange a plurality of light-deflecting devices 101 in a series or the form of an array. Light-deflecting devices 101 for this purpose may be pivotable for example respectively along one axis of rotation. The axes of rotation of light-deflecting devices 101 may be in parallel to one another, but may also differ from one another. Furthermore, light-deflecting devices 101 may be respectively pivotable in a two-dimensional manner.

What is claimed is:

1. A method comprising:
    emitting a first light beam and a second light beam that enclose a light beam angle, the first light beam and the second light beam being emitted onto the light-deflecting device;
    receiving the first light beam and the second light beam deflected by the light-deflecting device and reflected by an object;
    calculating a first propagation path of the first light beam and a second propagation path of the second light beam;
    pivoting the light-deflecting device from an initial position to a final position;
    measuring respective slewing angles of the light-deflecting device;
    determining a dependency of the first propagation path on the measured slewing angles; and
    calculating an angle error for one of the measured slewing angles, which is to be corrected, by using the light beam angle, the second propagation path, and the dependency of the first propagation path on the measured slewing angle.

2. The method as recited in claim 1, further comprising:
    calculating an actual slewing angle on the basis of the light beam angle; and
    calculating the angle error by comparing the measured slewing angle to be corrected with the actual slewing angle.

3. The method as recited in claim 1, further comprising determining the measured slewing angle to be corrected as that measured slewing angle for which the first propagation path is of a magnitude that is the same as a magnitude of the second propagation path in the initial position.

4. The method as recited in claim 1, further comprising:
    determining, during the pivoting of the light-deflecting device, a dependency of the second propagation path on the measured slewing angle; and
    calculating the angle error by using the dependency of the second propagation path on the measured slewing angle.

5. The method as recited in claim 4, further comprising determining the measured slewing angle to be corrected as that measured slewing angle by which the first propagation path as a function of the measured slewing angle must be shifted in order to match the second propagation path as a function of the measured slewing angle at least in one slewing angle range about the initial position.

6. A light-emitting device, comprising:
    a pivoting light-deflecting device for deflecting a light beam;
    a transmitting device that includes a light source for emitting onto to the light-deflecting device a first light beam and a second light beam that enclose a light beam angle;
    a detector for receiving the first light beam and the second light beam deflected by the light-deflecting device and reflected by an object; and
    processing circuitry interfacing with the pivoting light-deflecting device, wherein the processing circuitry is configured to:
        determine a dependency of a first propagation path of the first light beam on measured slewing angles of the light-deflecting device measured while the light-deflecting device is being pivoted from an initial position to a final position;
        determine an angle error of one of the measured slewing angles, which is to be corrected, by using the light beam angle, a second propagation path of the second light beam, and the determined dependency; and
        control the pivoting light-deflecting device based on a current measured slewing angle and the determined angle error.

7. The light-emitting device as recited in claim 6, wherein the transmitting device includes a beam splitter that splits the emitted light beam into the first light beam and the second light beam.

8. The light-emitting device as recited in claim 6, wherein the control of the pivoting light-deflecting device causes the pivoting light-deflecting device to pivot about a specified actual slewing angle.

9. The light-emitting device as recited in claim 6, wherein the angle error is determined by comparing the one of the measured slewing angles, which is to be corrected, with an actual slewing angle determined based on the light beam angle.

10. The light-emitting device as recited in claim 6, wherein the one of calculating device determines the measured slewing angles, which is to be corrected, is selected as that measured slewing angle for which the first propagation path is of a magnitude that is the same as a magnitude of the second propagation path had been in the initial position.

* * * * *